United States Patent
Azzouz et al.

(10) Patent No.: US 12,088,181 B2
(45) Date of Patent: Sep. 10, 2024

(54) MOTORIZED VENTILATION DEVICE WITH AN IMPELLER FOR A MOTOR VEHICLE

(71) Applicant: Valeo Systemes Thermiques, Le Mesnil-Saint-Denis (FR)

(72) Inventors: Kamel Azzouz, Le Mesnil Saint Denis (FR); Amrid Mammeri, Le Mesnil Saint Denis (FR); Farid Bakir, Le Mesnil Saint Denis (FR); Sofiane Khelladi, Le Mesnil Saint Denis (FR); Cedric Lebert, Le Mesnil Saint Denis (FR)

(73) Assignee: VALEO SYSTEMES THERMIQUES, Le Mesnil-Saint-Denis (FR)

(*) Notice: Subject to any disclaimer, the term of this patent is extended or adjusted under 35 U.S.C. 154(b) by 484 days.

(21) Appl. No.: 17/254,511

(22) PCT Filed: Jun. 19, 2019

(86) PCT No.: PCT/FR2019/051497
§ 371 (c)(1),
(2) Date: Dec. 21, 2020

(87) PCT Pub. No.: WO2019/243739
PCT Pub. Date: Dec. 26, 2019

(65) Prior Publication Data
US 2021/0218315 A1    Jul. 15, 2021

(30) Foreign Application Priority Data
Jun. 21, 2018   (FR) ........................................ 1855532

(51) Int. Cl.
*H02K 5/20*         (2006.01)
*F04D 25/08*        (2006.01)
(Continued)

(52) U.S. Cl.
CPC .............. *H02K 9/06* (2013.01); *F04D 25/082* (2013.01); *H02K 5/207* (2021.01); *F04D 29/329* (2013.01); *H02K 7/14* (2013.01)

(58) Field of Classification Search
CPC ............ H02K 1/32; H02K 5/207; H02K 5/20; H02K 7/14; H02K 9/06; F04D 25/08; F04D 29/5806; F04D 29/329
See application file for complete search history.

(56) References Cited

U.S. PATENT DOCUMENTS 2,620,970 A * 12/1952 Palmer .................. F04D 29/329
                                                        416/93 R
5,909,339 A *  6/1999 Hong .................. G11B 33/1446
                                                        310/90

(Continued)

FOREIGN PATENT DOCUMENTS

CN    103671250 A      3/2014
CN    105518980 A  *   4/2016  ............... H02K 5/20

(Continued)

OTHER PUBLICATIONS

Tao, machine translation of CN105518980, Apr. 2016 (Year: 2016).*

(Continued)

Primary Examiner — Eric Johnson
(74) Attorney, Agent, or Firm — Osha Bergman Watanabe & Burton LLP

(57) ABSTRACT

A motorized ventilation device for a motor vehicle, comprising an impeller (1) free to rotate about an axis (X) and formed by a cup (2), on which blades (3) are disposed, a bell cap (6) of an electric motor partly housed inside the cup (2), a centrifugal device (8) disposed between the cup (2) and the bell cap (6) and configured to guide and to accelerate an air flow (F2). The cup (2) comprises at least one opening (20, 27) for the passage of the air flow (F2) and the bell cap (6)

(Continued)

comprises at least one orifice (65, 66, 67) for the passage of the air flow (F2).

12 Claims, 4 Drawing Sheets

(51) Int. Cl.
*F04D 29/32* (2006.01)
*H02K 7/14* (2006.01)
*H02K 9/06* (2006.01)

(56) References Cited

U.S. PATENT DOCUMENTS

| | | | |
|---|---|---|---|
| 5,944,497 A * | 8/1999 | Kershaw | F04D 29/5806 |
| | | | 417/368 |
| 7,541,702 B2 * | 6/2009 | Murakami | H02K 9/06 |
| | | | 310/67 R |
| 2006/0119195 A1 * | 6/2006 | Liu | F04D 25/082 |
| | | | 310/85 |
| 2007/0152519 A1 | 7/2007 | Jarrah et al. | |
| 2008/0193275 A1 | 8/2008 | De Filippis et al. | |
| 2009/0191070 A1 * | 7/2009 | Kawachi | H02K 9/06 |
| | | | 417/366 |
| 2010/0178181 A1 * | 7/2010 | Chen | F04D 29/329 |
| | | | 165/185 |
| 2014/0064941 A1 * | 3/2014 | Parodi | F04D 25/082 |
| | | | 415/177 |
| 2016/0186771 A1 * | 6/2016 | Evers | F04D 17/16 |
| | | | 416/90 R |
| 2016/0290346 A1 | 10/2016 | Watanabe et al. | |
| 2019/0390680 A1 * | 12/2019 | Chang | F04D 25/0606 |

FOREIGN PATENT DOCUMENTS

| | | | | |
|---|---|---|---|---|
| CN | 105612355 A | | 5/2016 | |
| CN | 108026936 A | | 5/2018 | |
| DE | 102013215808 A1 | | 2/2015 | |
| GB | 2029125 A | * | 3/1980 | ........... F04D 25/082 |
| JP | H10-191593 A | | 7/1998 | |
| TW | 201636510 A | | 10/2016 | |

OTHER PUBLICATIONS

The First Office Action issued in Chinese Application No. 201980048873.0, mailed on Dec. 31, 2021 (13 pages).

International Search Report and Written Opinion in corresponding International Application No. PCT/FR2019/051497, mailed Nov. 13, 2019 (12 pages).

* cited by examiner

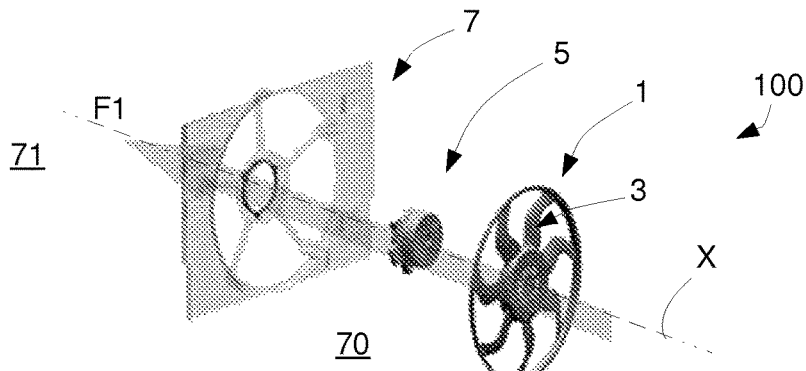
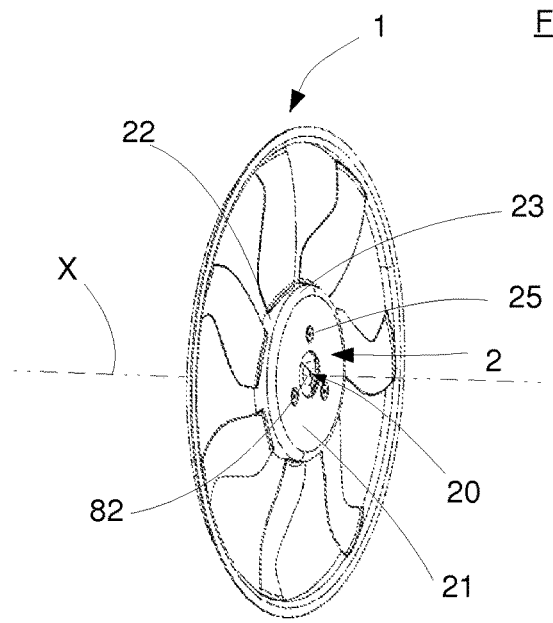
FIG.2A
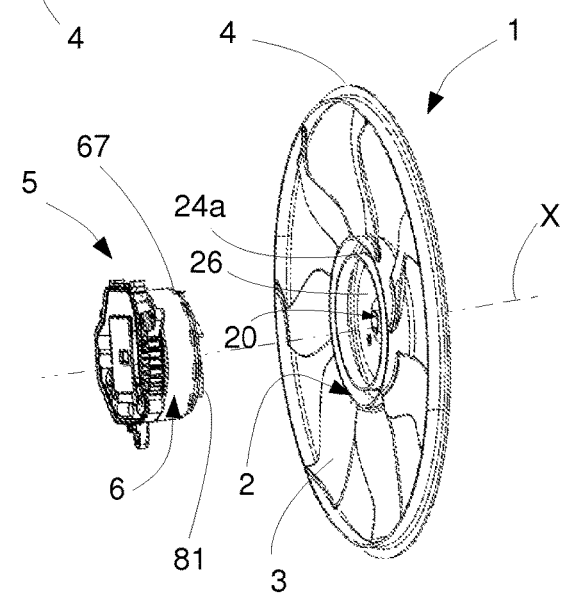
FIG.2B
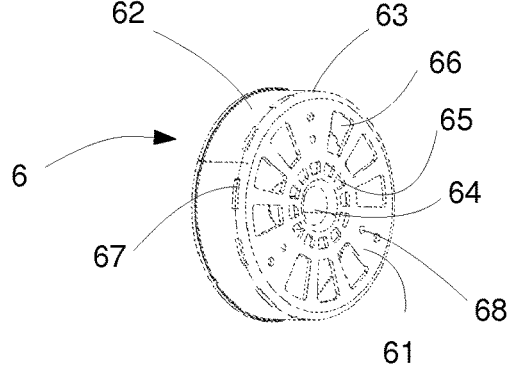
FIG.3A
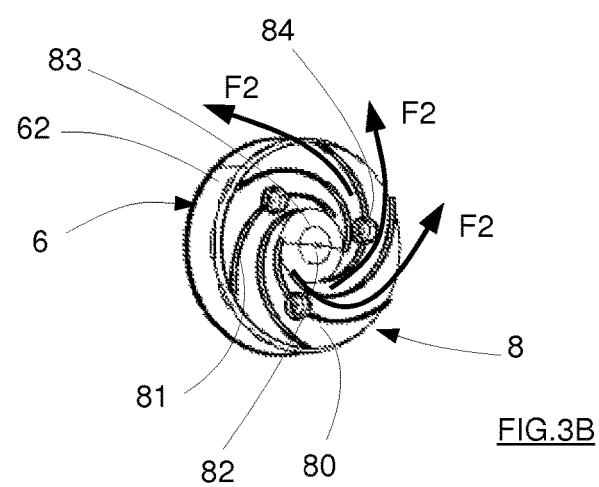
FIG.3B

MOTORIZED VENTILATION DEVICE WITH AN IMPELLER FOR A MOTOR VEHICLE

The present invention relates to the field of ventilation devices for a motor vehicle, and more specifically to electric ventilation devices.

In this field, it is particularly known for an impeller to be proposed that comprises a central hub, around which blades are evenly disposed and inside which an electric motor is provided to set the impeller into rotation. Controlling the electric motor allows the impeller of the fan to be implemented in order to generate a main air flow from outside the vehicle toward the engine compartment in particular, which air flow can be used to cool the components of the motor vehicle that are likely to release heat.

It is known for the air flow to be used to help to cool the electric motor in order to avoid overheating of the electronic components of this motor, which overheating could reduce the performance capabilities of the electric motor or lead to a failure thereof.

Document US 2008/193275 proposes a fan impeller equipped with an electric motor that is intended to be cooled. The impeller comprises a cup forming a central hub and blades evenly distributed around the cup. The electric motor is partly housed in the cup of the impeller so as to together define an air passage between the outer profile of the motor and the cup of the impeller. During operation, the rotation movement of the electric motor generates a secondary air flow movement passing through the electric motor from the rear, i.e. opposite the cup of the impeller, through orifices. The secondary air flow is thus used to dissipate the heat released by the electric motor and by its electric components. The secondary air flow is subsequently directed toward an inner face of the cup comprising ribs radially guiding the air flow toward the passage formed between the outer profile of the motor and the cup of the impeller. The air flow is then discharged out of the impeller.

However, this solution particularly has the disadvantage of dissipating the secondary air flow out of the impeller toward the rear of said impeller, i.e. on the side where the motor is located. The secondary air flow redirected toward the motor is an air flow that has been heated from being used to cool the electric motor, such that this air flow does not allow optimal dissipation of the heat released by the electric motor and by its electric components.

The aim of the present invention is to overcome at least one of the aforementioned disadvantages and to propose a motorized ventilation device for a motor vehicle allowing the performance capabilities for cooling an electric motor to be improved.

To this end, the aim of the invention is a motorized ventilation device for a motor vehicle, comprising, on the one hand, an impeller free to rotate about an axis and comprising a cup, on which blades are disposed, and, on the other hand, a bell cap of a motor partly housed inside the cup, as well as a centrifugal device disposed between the cup and the bell cap and configured to guide and to accelerate an air flow. According to the invention, the bell cap comprises at least one orifice for the passage of the air flow and the cup comprises at least one opening for the passage of the air flow.

Thus, it is possible to dissipate an air flow passing through the electric motor from one side of the impeller to the other side of the impeller. It is then possible to optimize the supply of a cool air flow for the electric motor housed in the impeller, in order to cool this electric motor and these electronic components.

It is understood that during operation the rotation movement of the blades of the impeller create a pressure difference between each side of the impeller. This pressure difference then leads to the creation of an air flow that can pass through the at least one orifice of the bell cap of the motor and the at least one opening of the cup at the same time.

The centrifugal device is arranged to orient the air flow passing through the electric motor toward the at least one air passage orifice provided in the bell cap, when this air flow passes through the motor from the outside of the impeller to the inside, i.e. from the outside of the vehicle toward the engine compartment, or even to orient the air flow passing through the electric motor from the air passage opening provided in the cup, when this air flow passes through the motor from the inside of the impeller to the outside, i.e. from the engine compartment toward the outside of the vehicle.

According to a first set of features of the invention, taken alone or in combination, the following can be provided:
  the centrifugal device comprises at least one vane axially extending between the cup and the bell cap; the at least one vane originates on an independent plate applied against a face of the cup or a face of the bell cap, or it even originates directly from a face of the cup or a face of the bell cap;
  the at least one vane is spiral shaped;
  the centrifugal device comprises a plurality of vanes that are evenly angularly distributed about the axis;
  the at least one opening for the passage of the air flow is formed at the center of the cup;
  the centrifugal device comprises a plate for supporting the at least one vane, said plate being pressed against the bell cap and the at least one vane extending by projecting from the plate toward the cup of the impeller;
  the vanes of the centrifugal device are in abutment against the cup;
  the plate comprises a domed part at least at the center thereof positioned in the axis of the at least one opening for the passage of the air flow formed at the center of the cup.

Provision also can be made for the at least one vane of the centrifugal device to be formed on an inner face of the cup, perpendicular to the axis, so as to extend axially toward the outer face of the bell cap. In particular, the vanes formed on the first face of the cup can be in abutment against this outer face of the bell cap, with the outer face of the bell cap and the vanes forming the centrifugal device. The bell cap can comprise a domed part that is produced independently and is applied to the center of the second face and is positioned in the axis of the at least one opening for the passage of the air flow.

Provision particularly can be made for the at least one orifice of the bell cap to be disposed on the periphery thereof; the secondary air flow, radially directed by the centrifugal device after it arrives via the opening for the passage of air in the cup, can then pass through the at least one peripheral orifice of the bell cap in order to enter inside the bell cap and cool the components of the electric motor; the bell cap can comprise a plurality of orifices, evenly angularly distributed about the axis.

According to one embodiment of the invention, the cup of the impeller can comprise, on its internal profile, an annular extension part extending toward the inside of the cup and shaped so as to match the bell cap in order to enable a radial interference fit between the cup and the bell cap. Furthermore, the orifices can be located in a peripheral zone of the bell cap included between the inner edge of the annular extension and the outer diameter of the bell cap.

According to another set of features of the invention, taken alone or in combination, the following can be provided:

the at least one opening for the passage of the air flow is produced on the periphery of the cup: the cup can have a plurality of these openings and these openings can be evenly angularly distributed about the axis;

the centrifugal device is disposed on the cup of the impeller, with the support plate of the at least one vane being pressed against the cup of the impeller, and the centrifugal device can be in abutment, via the vanes, against the bell cap;

the at least one vane of the centrifugal device is integrally formed with the inner face of the cup;

the at least one vane formed on the inner face of the cup is in abutment against the bell cap in order to form the centrifugal device;

an annular shaped deflector is disposed between the bell cap and the cup, in the extension of an outer face of the bell cap on which the at least one vane is in abutment;

one face of the deflector is flush with the second face of the bell cap;

the bell cap comprises orifices on an outer face perpendicular to the axis and facing the cup;

the orifices formed in the bell cap are evenly angularly distributed about the axis;

the bell cap comprises orifices on the periphery.

According to another feature of the invention, the centrifugal device and the cup respectively comprise first and second holes that are matching and are configured to allow fixing screws to be housed that are received in first fixing holes of the bell cap.

Further features, details and advantages of the invention will become more clearly apparent from reading the description, which is provided hereafter for information purposes, with reference to the drawings, in which:

FIG. 1 is an exploded perspective view of the motorized ventilation device showing an impeller, a motor equipped with a bell cap, and an impeller support shroud;

FIG. 2A is a perspective view of a first embodiment of the ventilation device according to the invention shown from the front side of the impeller, and wherein, during operation, an air flow flows from the front side of the impeller toward a rear side of the impeller through an opening formed at the center of the cup of the impeller;

Figure 4:
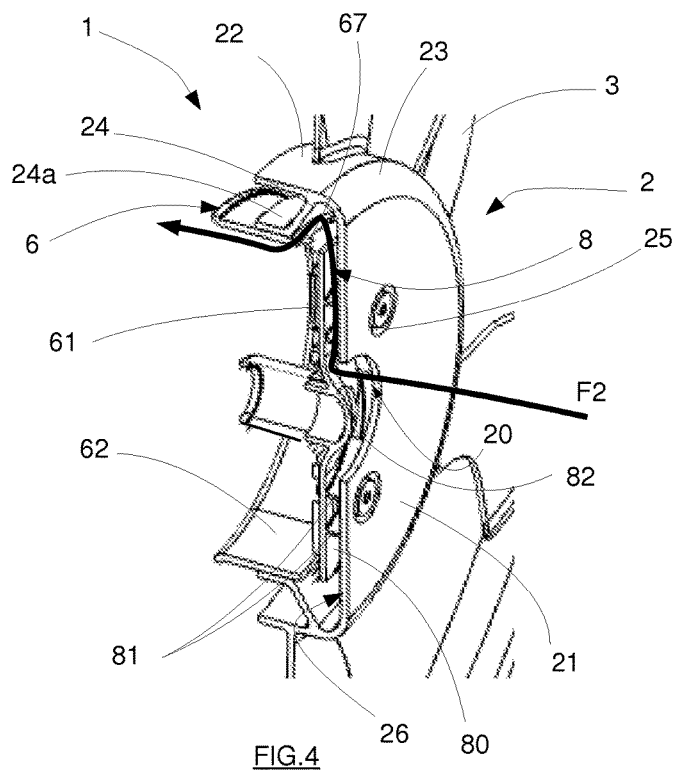
Figure 5A:
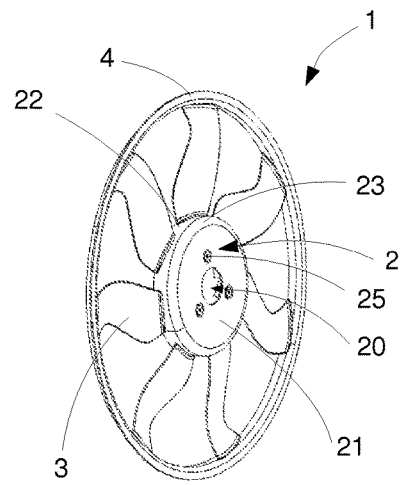
Figure 5B:
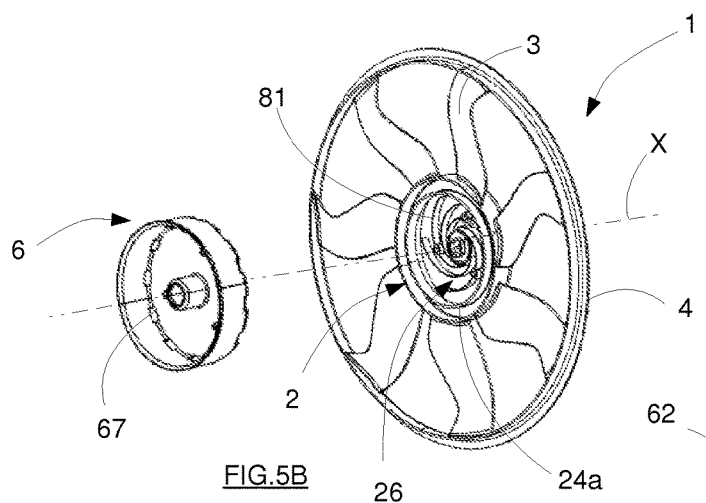
Figure 6:
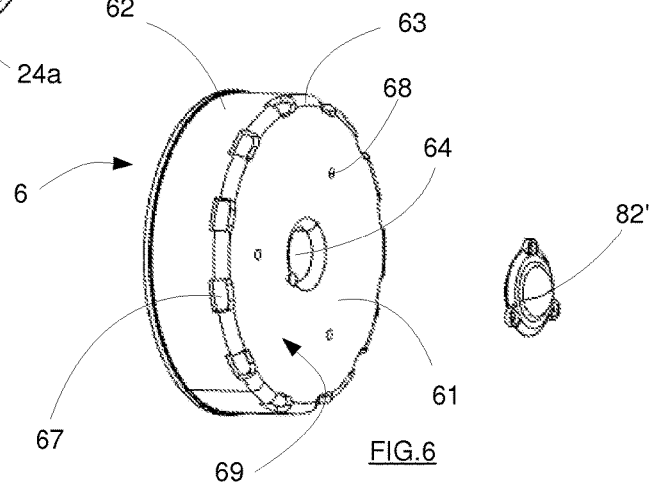
Figure 7:
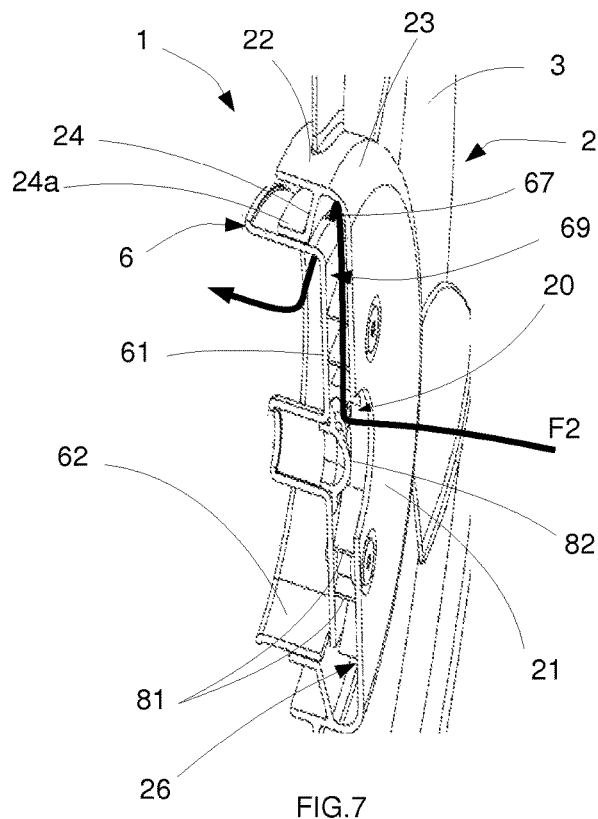
Figure 8A:
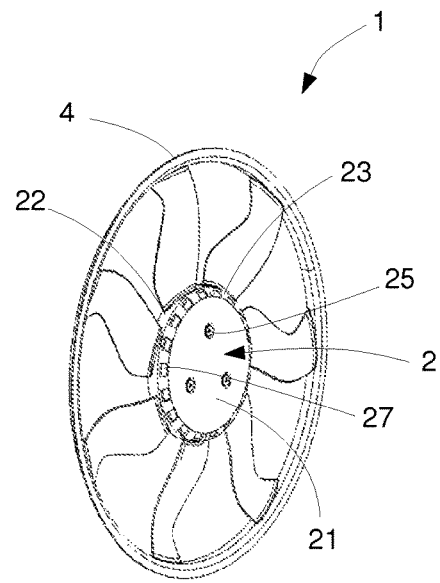
Figure 8B:
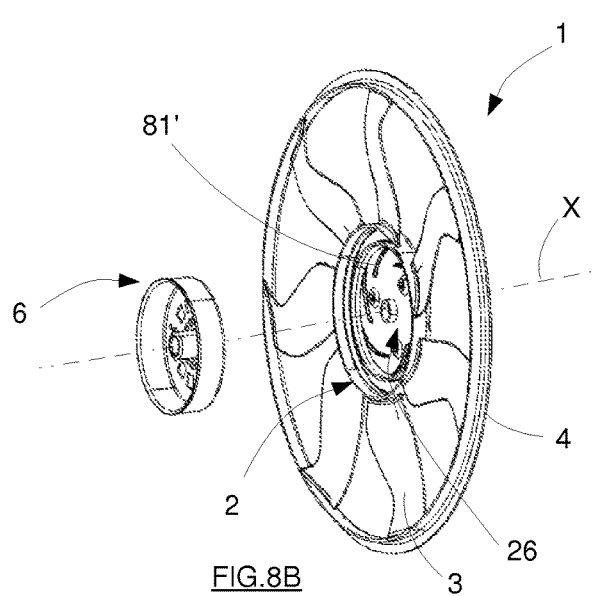
Figure 9:
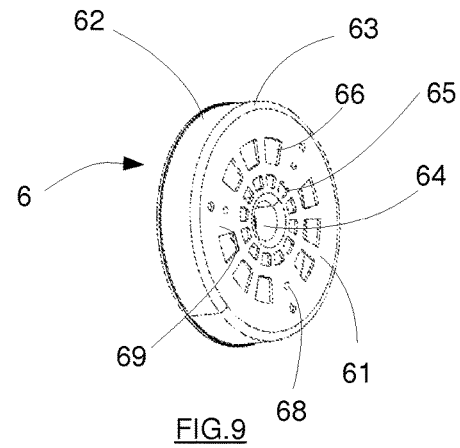
Figure 10:
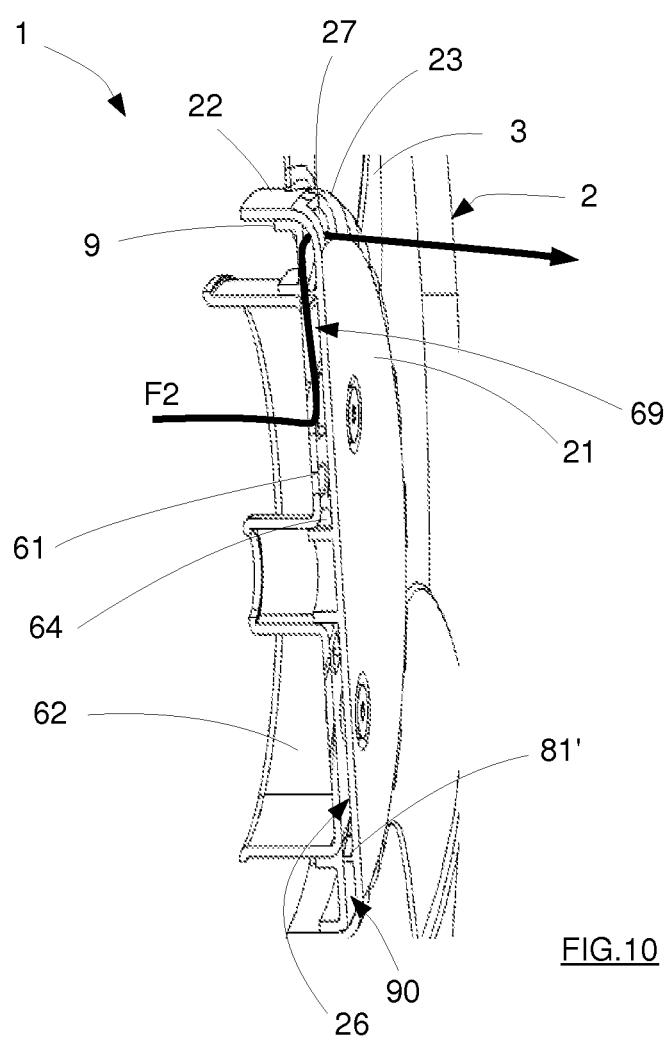

FIG. 2B is an exploded perspective view of the first embodiment of the device of FIG. 2A shown from the rear side of the impeller, and which shows the impeller and the electric motor equipped with a bell cap and able to be housed in the cup of the impeller, with the electric motor in this case being equipped, on the face facing the impeller, with a centrifugal device, two vanes of which are partially shown;

FIG. 3A is a perspective view of the bell cap of the motor shown in FIG. 2 without the centrifugal device;

FIG. 3B is a front perspective view of the bell cap of the motor shown in FIGS. 2 and 3 equipped with the centrifugal device;

FIG. 4 is a cross-sectional perspective view of a section of the ventilation device according to the first embodiment of the invention, which shows the cup of the impeller, the centrifugal device and the bell cap of the motor as assembled in the cup of the impeller, and a schematic representation of the air flow passing through the device;

FIG. 5A is a perspective view of a variant of the first embodiment of the ventilation device according to the invention shown from the front side of the impeller, and in which the centrifugal device, not shown in this FIG. 5A, is partly formed inside the cup of the impeller;

FIG. 5B is an exploded perspective view of the variant of the first embodiment of the device of FIG. 5A shown on the rear side of the impeller, in order to show the centrifugal device, and which only shows the bell cap of the electric motor for ease of understanding;

FIG. 6 is an exploded perspective view of the bell cap of the motor shown in FIG. 5B and of a domed part applied onto the bell cap;

FIG. 7 is a perspective cross-sectional view of the ventilation device according to the variant of the first embodiment of the invention, which shows the cup of the impeller, the centrifugal device and the bell cap of the motor as assembled in the cup of the impeller, and a schematic representation of the air flow passing through the device;

FIG. 8A is a perspective view of a second embodiment of the ventilation device according to the invention shown from the front side of the impeller, and in which the centrifugal device, not shown in this FIG. 8A, is partly formed on the cup of the impeller;

FIG. 8B is an exploded perspective view of the second embodiment of the device of FIG. 8A shown from the rear side of the impeller in order to show the centrifugal device, and which only shows the bell cap of the electric motor for ease of understanding;

FIG. 9 is a perspective view of the bell cap of the motor shown in FIG. 8B;

FIG. 10 is a perspective section view of the ventilation device according to the second embodiment of the invention, which shows the cup of the impeller, the centrifugal device and the bell cap of the motor as assembled in the cup of the impeller and a schematic representation of the air flow passing through the device.

FIG. 1 shows a ventilation device 100 of the type partly disposed at the front of an engine compartment, for supplying this engine compartment with fresh air. The ventilation device particularly comprises a motorized impeller, so that the rotation of the impeller and the speed of this rotation can be controlled depending on the operating modes of the vehicle.

The ventilation device 100 comprises an impeller 1 formed by a cup 2 and by blades 3 evenly disposed on the cup 2 about an axis X. The blades 3 secured to the cup 2 extend radially in relation to the axis X toward the outside from the cup 2, in order to be engaged with a retention ring 4 helping to mutually stiffen the blades 3. An electric motor 5 equipped with a bell cap 6 is intended to be at least partly housed in the cup 2 of the impeller 1, and it is the control of the electric motor 5 that allows the rotation, about the axis X, of the cup 2 and of the rotationally secured blades 3.

In practice, the motorized ventilation device is mounted in a support shroud 7 defining an upstream side 70 and a downstream side 71 corresponding to the direction of circulation of the main air flow F1 generated by the rotation movement of the blades 3 of the impeller 1 about the axis X and by a pressure difference between the upstream side 70 and the downstream side 71. This main air flow F1 is thus directed toward the engine compartment, corresponding to the downstream side 71.

A particular arrangement of the cup and of the bell cap will be described hereafter for implementing a secondary air flow F2 for cooling the electric motor 5. The arrangement and the general orientation of the impeller 1, as shown in FIG. 1, also equally correspond to a first embodiment of the invention allowing cooling of the first type, called "front cooling" and described hereafter, or to a second embodiment of the invention allowing cooling of the second type, called "back cooling" and described after the first embodiment.

In each case, a centrifugal device 8 is provided that is arranged between the bell cap 6 and the cup 2 to radially orient and accelerate the secondary air flow F2, and this centrifugal device will be described in further detail hereafter as a function of the embodiments mentioned above.

FIGS. 2 to 4 show the motorized ventilation device according to the first embodiment corresponding to the operation called "front cooling", in which a secondary air flow F2 flows from the upstream side 70 to the downstream side 71, i.e. in the same direction as the main air flow F1, passing through an opening 20 arranged in the center of the cup 2 of the impeller 1.

The cup 2 is formed by a flat central wall 21 that is circular shaped and is extended substantially perpendicular to its periphery by a lateral wall 22, with a connecting wall 23 being arranged between this central wall 21 and this lateral wall 22. In this way, the cup 2 has a concave shape when viewed from the downstream side 71. The blades 3 of the impeller 1 extend radially from the lateral wall 22.

The central wall 21 of the cup 2 comprises, at the center thereof, the circular shaped opening 20, the center of which coincides with the axis X.

FIG. 2B shows the electric motor 5 in its assembly orientation as inserted in the cup 2 of the impeller 1. The electric motor 5 is a permanent magnet motor and comprises a stator, a rotor and electric components contained in the bell cap 6 of the electric motor 5.

As can be seen in FIG. 4, the lateral wall 22 of the cup 2 of the impeller 1 comprises, on the inner face thereof, an annular extension part 24 radially extending toward the inside of the cup 2 and comprising, at the free end thereof, a folded edge 24a configured to axially extend along the axis X. In this way, the folded edge 24a defines an annular sleeve with a diameter that is slightly greater than the diameter of the bell cap 6 of the electric motor 5, in order for the bell cap to be adjusted inside this sleeve.

In order to facilitate the understanding of the invention, the electric motor 5 is only represented by its bell cap 6 throughout the remainder of the description and the figures.

FIG. 3A particularly shows the bell cap 6 of the electric motor 5 formed by a flat central part 61 of circular shape substantially extended perpendicularly by a lateral part 62 via an intermediate part 63, such that the bell cap 6 has a concave shape when viewed from the downstream side 71.

The central part 61 of the bell cap 6 comprises, at the center thereof, a through opening 64 for a drive shaft of the electric motor 5. First and second orifices 65, 66 are also provided on the central part 61 of the bell cap 6 around this through opening 64. A first series of these first orifices 65 is disposed immediately around the through opening 64, and the second orifices 66 are arranged around this first series of first orifices 65, between said orifices and the intermediate part 63.

Furthermore, the bell cap 6 comprises third orifices 67 formed at the junction of the lateral part 62 and of the intermediate part 63. In this way, it is possible to distinguish the central orifices of the bell cap formed by the first and second orifices and the peripheral orifices of the bell cap formed by the third orifices 67.

The centrifugal device 8 in this case is mounted on the bell cap 6 of the electric motor 5, as shown in FIG. 3B. A centrifugal device 8 comprises a plate 80 and vanes 81 formed so as to project from a first face of the plate 80. The vanes 81 have a spiral shape that is identical from one vane to the next and they are evenly angularly distributed about the axis X. The vanes 81 spirally extend from a circular central zone 83 arranged at the center of the plate 80 and having a shape and dimensions that are identical to those of the opening 20 provided in the cup 2 of the impeller 1.

It is to be noted that, in this first embodiment, the centrifugal device 8 is pressed against the central part 61 of the bell cap 6, so as to seal the first and second orifices 65, 66 forming the central orifices provided in this bell cap 6. The second face of the plate 80, i.e. that which is opposite the face supporting the vanes 81, is pressed against the central part of the bell cap. As can be seen in FIG. 3B in particular, the plate 80 of the centrifugal device 8 is designed so as not to obstruct the third orifices 67 provided at the junction of the intermediate part 63 and of the lateral part 62. It is the arrangement of the third orifices 67 on the periphery of the bell cap and the flat shape of the plate 80 of the centrifugal device that provides the clearance for the third orifices and the possible circulation of an air flow therethrough, while the centrifugal device is in place against the bell cap.

In particular in FIGS. 3B and 4, it can be seen that the plate 80 of the centrifugal device 8 comprises a domed part 82 demarcated by the central zone 83.

FIG. 4 shows a perspective cross-sectional view of a section of the impeller 1 comprising the cup 2, inside which the bell cap 6 of the electric motor 5 is housed, on which bell cap the centrifugal device 8 is applied. In this configuration of the first embodiment, the centrifugal device 8 is in abutment via the vanes 81 against the inner face 26 of the central wall 21 of the cup 2. The bell cap 6, the centrifugal device 8 and the cup of the impeller 2 are then stacked in this order along the axis X and these components are centered on this axis X, forming a common axis of the device. The domed part 82 of the plate 80 of the centrifugal device 8 is then opposite the opening 20 of the cup 2.

The mutual positioning of the bell cap 6, of the centrifugal device 8 and of the cup of the impeller is provided by screwing means passing through and clamping the centrifugal device between the bell cap and the cup. In order to enable this fixing, first fixing holes 68 are formed in the central part 61 of the bell cap 6 of the electric motor 5, and the centrifugal device 8 and the cup 2 respectively comprise first and second bores 84, 25 that are matching and are configured to allow fixing screws to be housed that are received in the first fixing holes 68 of the bell cap 6.

When the bell cap 6 is housed in the cup 2 of the impeller 1, the extension part 24 of the lateral wall 22 of the cup 2 of the impeller 1 engages, via its folded edge 24a, against the lateral part 62 of the cup 2 of the impeller 1, in order to form an interference fit between the cup 2 and the bell cap 6.

As is particularly shown in FIG. 4, the intermediate part 63 of the bell cap 6 is facing the connecting wall 23 of the cup 2, so that the third orifices 67 disposed on the intermediate part 63 of the bell cap 6 are not obstructed by the extension part 24 of the lateral wall 22 of the cup 2.

The operation of the ventilation device according to the first embodiment will now be described.

During operation, the electric motor 5 sets the impeller 1 into rotation and forms the main air flow F1. The rotation of the electric motor 5 also causes the rotation of the centrifugal device 8 arranged between the bell cap 6 and the cup of the impeller 2. This rotation of the centrifugal device 8 then allows a secondary air flow F2 to be generated that enters the cooling device according to the invention through the opening 20 of the cup 2 of the impeller 1. The secondary air flow F2 is then radially diverted by the domed part 82 toward the vanes 81 inside this cup.

The secondary air flow F2 is subsequently accelerated and radially guided toward the periphery of the cup by the rotation movement of the centrifugal device 8. As shown in FIG. 4, the secondary air flow F2 flows, from the opening 20 provided at the center of the cup 2, over the length of the plate 80 of the centrifugal device, between the vanes 81, the spiral shape of which facilitates the expulsion of air toward the periphery of the cup.

With reference to FIG. 4, the secondary air flow F2, which is schematically shown for ease of understanding, is then guided by the vanes 81 toward the periphery of the cup, and more specifically toward the connecting wall 23 thereof. The air projected against this connecting wall tends to return toward the bell cap of the motor by running along the extension part 24 of the lateral wall 22 of the cup, and the secondary air flow then passes through the bell cap 6 of the electric motor 5 by means of the third orifices 67 provided in the intermediate part 63. The secondary air flow F2 then cools the electric motor 5, and in particular its electronic components.

FIGS. 5 to 7 show an alternative embodiment of the first embodiment, which differs from the previous description in that the centrifugal device is not pressed against the bell cap of the motor. The vanes 81 of the centrifugal device 8 in this case are integrally formed with the central wall 21 of the cup 2, by extending as a projection toward the bell cap from the inner face 26 of this central wall. In a similar or equivalent manner to the above, the vanes 81 radially extend from the opening 20 of the cup 2 toward the periphery of the cup.

In order to radially guide the secondary air flow F2 along the bell cap and along the cup, between the spirals formed by the vanes, provision is made to replace the plate 80 of the first embodiment with a bell cap 6, the central part 61 of which has a solid outer face 69, i.e. it does not comprise the first and second orifices 65, 66 as illustrated in the first embodiment. The central part 61 of the bell cap 6 then can be used to radially guide the secondary air flow F2. It is understood that, according to the above, the bell cap is fixed inside the cup of the impeller by suitable screwing means, and this fixing presses the central part 61 of the bell cap 6 against the vanes 81 formed on the central wall 21 of the cup 2.

In this alternative embodiment, the centrifugal device is then formed by the central part 61 of the bell cap 6 in abutment against the vanes 81.

As shown in FIG. 6, the alternative embodiment also differs in that, given that the domed part acting as a deviation for the air passing through the through opening 20 in the cup can no longer be supported by a plate of the centrifugal device, the bell cap 6 is configured to accommodate, in the center thereof, a domed part 82', which in the example illustrated in FIG. 6 is applied by screwing onto the central part 61 of the bell cap 6.

When the bell cap 6 is mounted in the cup 2, the domed part 82' is then opposite the opening 20 of the cup 2. During operation, the principle is identical to that described for the first embodiment, except that the secondary air flow F2 flows over the outer face 69 of the central wall 61 of the bell cap 6.

FIGS. 8 to 10 show the motorized ventilation device according to the second embodiment corresponding to the operation called "back cooling", in which the secondary air flow F2 flows from the downstream side 71 to the upstream side 70, i.e. in the opposite direction to that of the main air flow F1, passing through openings 27 provided on the periphery of the cup 2 of the impeller 1.

In this embodiment, the central wall 21 of the cup 2 is closed at the centre thereof, whereas the partition wall 23 comprises the peripheral openings 27, which are evenly angularly distributed about the axis X.

As shown in FIG. 8B, vanes 81' are formed on the inner face 26 of the central wall 21 of the cup 2 integrally formed with the cup. The vanes 81' are curved, in a spiral arrangement similar to that described above, and they are also evenly angularly distributed about the axis X.

The bell cap 6 must, in this embodiment, comprise, on the central part 61 thereof, the first and second orifices 65, 66, as described in the first embodiment. In the example illustrated in FIG. 9, the intermediate part 63 is solid and does not comprise air passage orifices compared to those produced in the bell cap of the first embodiment. However, as will be particularly explained in further detail hereafter in the description of the assembled device, the bell cap 6 used in this second embodiment could be exactly the one used in the first embodiment and illustrated in FIG. 3A, i.e. with peripheral orifices, with the main point of this second embodiment being the presence of the first and second orifices on the central part 61 for a passage of air substantially parallel to the axis X from the inside of the motor to the outside of the motor, toward the cup.

FIG. 10 shows a perspective cross-sectional view of a section of the impeller 1 comprising the cup 2, inside which the bell cap 6 of the electric motor 5 is housed and with the centrifugal device 8 disposed between the bell cap and the cup. In this configuration of the second embodiment, the centrifugal device 8 is in abutment via the vanes 81' against the outer face 69 of the central wall of the bell cap 6. The bell cap 6, the centrifugal device 8 and the cup of the impeller 2 are then stacked in this order along the axis X and these components are centered on this axis X, forming a common axis of the device. In this second embodiment, the bell cap does not comprise a domed central part, since the cup does not have a central air passage opening.

Furthermore, an annular shaped deflector 9 is disposed between the bell cap 6 and the cup 2 in order to be in abutment both against the lateral wall 22 of the cup 2 and against the lateral part 62 of the bell cap 6. The deflector 9 is positioned so that one of the faces 90 thereof is flush with the outer face 69 of the central part 61 of the bell cap 6, and so as to radially extend the bell cap up to the cup. The shape of the deflector 9 is such that it will cover the third orifices if the bell cap is provided therewith.

It will be understood that, in this second embodiment, the centrifugal device is formed by the vanes 81' and the central wall 21 of the cup 2.

During operation, the rotation of the motor generates a secondary air flow F2 flowing from the downstream side 71 to the upstream side 70, with this secondary air flow F2 then passing through the motor in order to cool the motor by being directed through the first and second orifices 65, 66 provided in the central part of the bell cap. The secondary air flow F2 enters the cup 2 of the impeller until it encounters the inner face 26 of the central wall 21 of the cup 2. The secondary air flow F2 is accelerated by the centrifugal movement created by the rotation of the vanes 81', and it flows along the inner face 26 of the central wall 21 of the cup 2 in order to be guided, in particular by the deflector 9, on the periphery of the cup 2 and to flow outside the impeller, while particularly passing through the peripheral openings 27.

Of course, the invention is not limited to the embodiments described above and represented in the accompanying drawings. In particular, the following can be provided from a non-exhaustive list of alternative embodiments:
- a bell cap of an electric motor comprising peripheral orifices exclusively formed on the lateral part of the bell cap and not partially formed on the intermediate part;
- an extension part of the lateral wall of the cup that is configured to ensure deflection instead of the added part forming the deflector.

Other modifications remain possible, in particular with respect to the formation of the various elements or by substituting equivalent techniques, without departing from the scope of protection of the invention, provided that the cup of the impeller and the bell cap of the motor respectively comprise one or more openings allowing air to enter or exit depending on the secondary cooling mode that is implemented, in a context of a centrifugal device disposed between an electric motor bell cap and a motorized impeller cup.

The invention claimed is:

1. A motorized ventilation device for a motor vehicle, comprising:
   an impeller free to rotate about an axis and formed by a cup on which blades are disposed;
   a bell cap of an electric motor partly housed inside the cup;
   a centrifugal device disposed between the cup and the bell cap and configured to guide and to accelerate an air flow,
   wherein the cup comprises one opening for the passage of the air flow and wherein the bell cap comprises at least one orifice for the passage of the air flow,
   wherein the cup is formed by a central wall that is perpendicular to a periphery of the cup, and the cup has a concave shape,
   wherein the blades are evenly disposed and secured on the cup, extend radially toward an outside from the cup, and engage with a retention ring that stiffens the blades,
   wherein the centrifugal device comprises at least one vane axially extending between the cup and the bell cap, and
   wherein the at least one vane has a spiral shape, extends from a circular central zone, and the circular central zone has dimensions that are identical to those of the opening provided in the cup.

2. The ventilation device as claimed in claim 1, wherein the opening for the passage of the air flow is formed at the center of the cup.

3. The ventilation device as claimed in claim 2, wherein the centrifugal device comprises a plate for supporting the at least one vane, said plate being pressed against the bell cap and the at least one vane extending by projecting from the plate toward the cup of the impeller.

4. The ventilation device as claimed in claim 3, wherein the plate comprises a domed part at the center thereof, positioned so as to match the opening for the passage of the air flow formed at the center of the cup.

5. The ventilation device as claimed in claim 2, wherein the at least one vane of the centrifugal device is formed on an inner face of the cup facing the bell cap.

6. The ventilation device as claimed in claim 5, wherein the bell cap comprises a domed part applied at the center thereof, positioned so as to match the opening for the passage of the air flow formed at the center of the cup.

7. The ventilation device as claimed in claim 2, wherein the at least one orifice of the bell cap is disposed on the periphery of said bell cap.

8. The ventilation device as claimed in claim 1, wherein the cup of the impeller comprises, on its internal profile, an annular extension part extending toward the inside of the cup and shaped so as to match the bell cap in order to enable a radial interference fit between the cup and the bell cap.

9. The ventilation device as claimed in claim 1, wherein the centrifugal device is secured to an inner face of the cup of the impeller, so that the at least one vane is in abutment against the bell cap.

10. The ventilation device as claimed in claim 9, wherein the at least one vane of the centrifugal device is integrally formed with the inner face of the cup.

11. The ventilation device as claimed in claim 1, wherein the centrifugal device and the cup respectively comprise first and second bores that are matching and are configured to allow fixing screws to be housed that are received in first fixing holes of the bell cap.

12. A motorized ventilation device for a motor vehicle, comprising:
   an impeller free to rotate about an axis and formed by a cup on which blades are disposed, the cup comprising one opening for the passage of an air flow generated by the impeller;
   a bell cap of an electric motor partly housed inside the cup, the bell cap comprising at least one orifice;
   a centrifugal device disposed between the cup and the bell cap and configured to guide and to accelerate the air flow,
   wherein the air flow passes through the opening of the cup and the at least one orifice of the bell cap,
   wherein the cup is formed by a central wall that is perpendicular to a periphery of the cup, and the cup has a concave shape,
   wherein the blades are evenly disposed and secured on the cup, extend radially toward an outside from the cup, and engage with a retention ring that stiffens the blades,
   wherein the centrifugal device comprises at least one vane axially extending between the cup and the bell cap, and
   wherein the at least one vane has a spiral shape, extends from a circular central zone, and the circular central zone has dimensions that are identical to those of the opening provided in the cup.

* * * * *